United States Patent [19]

Kramer et al.

[11] Patent Number: 5,379,336
[45] Date of Patent: Jan. 3, 1995

[54] HYBRIDIZED SEMICONDUCTOR PIXEL DETECTOR ARRAYS FOR USE IN DIGITAL RADIOGRAPHY

[75] Inventors: Gordon Kramer, Palos Verdes Boulevard; Douglas W. Wolfe, El Segundo; Stuart Worley, Escondido; Timothy C. Collins, El Sobrante, all of Calif.

[73] Assignee: Hughes Aircraft Company, Los Angeles, Calif.

[21] Appl. No.: 124,351

[22] Filed: Sep. 20, 1993

Related U.S. Application Data

[63] Continuation of Ser. No. 887,217, May 21, 1992, abandoned.

[51] Int. Cl.$^6$ ............................................. G01T 1/29
[52] U.S. Cl. ..................................... 378/98.8; 378/62; 378/98.12; 250/370.09
[58] Field of Search ...................... 378/62, 51, 57, 58, 378/98, 99, 98.8, 98.12; 358/111; 250/320.09

[56] References Cited

U.S. PATENT DOCUMENTS

| | | | |
|---|---|---|---|
| 4,059,766 | 11/1977 | Rougeot | 250/370.08 |
| 4,415,980 | 11/1983 | Buchanan | 378/58 |
| 4,527,183 | 7/1985 | Anthony et al. | 250/370.08 |
| 4,684,812 | 8/1987 | Tew et al. | 250/370.08 X |
| 4,905,265 | 2/1990 | Cox et al. | 378/19 |
| 5,043,582 | 8/1991 | Cox et al. | 250/366 |

*Primary Examiner*—David P. Porta
*Attorney, Agent, or Firm*—Hugh P. Gortler; Michael W. Sales; Wanda K. Denson-Low

[57] ABSTRACT

A solid state x-ray detector which is a two-dimensional array of individual pixel elements is described. The hybrid semiconductor construction produces detector elements with high spatial resolution (<30 microns), high sensitivity to the entire x-ray spectrum, and frame rates greater than 1000 Hz. In a biomedical application these arrays provide high quality real time digital radiographic images that are directly coupled to an image processing system for image enhancement and computer aided diagnosis. In an alternative embodiment of the invention, the hybrid construction incorporated into an automated manufacturing process facilitates the real time, nondestructive, x-ray examination of manufactured objects during the production process. Structural defects in inorganic objects under test are identified in real time during the manufacturing process are corrected when feedback signals are generated from the electronic image data generated during the nondestructive test process.

19 Claims, 5 Drawing Sheets

HYBRIDIZED SEMICONDUCTOR PIXEL DETECTOR ARRAYS FOR USE IN DIGITAL RADIOGRAPHY

This is a continuation of application Ser. No. 07/887,217 filed May 21, 1992 now abandoned.

BACKGROUND OF THE INVENTION

The invention relates generally to hybrid pixel arrays used in x-ray imaging; and in particular, to non-destructive real-time examination of organic and inorganic subjects in biomedical applications and manufacturing processes, respectively.

It is known that conversion devices such as phosphor or scintillating material of some kind to produce visible light from x-rays. The x-rays when received by a solid state device are converted into an electronic signal. Visible light devices are also known which use silicon to convert x-rays directly to an electronic signal. They are fabricated as an individual large detector or as monolithic charge coupled devices (CCDs) having a relatively shallow sensitive region of approximately 10 microns. A single large detector or array of CCDs is suitable only for detecting and imaging x-rays at low energies, below 10 KeV.

There is a need to improve the resolution of existing scintillating and phosphor imagining devices which are relatively insensitive and have low contrast and spatial resolution.

Current x-ray imagining technology is adequate for real-time nondestructive inspection of manufacturing process in only a few specialized cases. Current real-time x-ray systems employ light converter screens or intensifiers that first convert the x-rays to visible light and then view the resulting visible image with conventional or low-light level vidicons or CCD cameras. These known systems suffer from reduced sensitivity and resolution because of the inefficiencies in the light converter screens and the multiple steps between sensing of the x-ray photons and the production of the resultant digital electronic image.

Shortcomings of screen techniques are the loss of efficiency in the process and spatial blurring caused by natural spreading of the fluorescent light as it travels to the detector. Also, spatial resolution and contrast sensitivity are limited not only by the x-ray converter screen, but by the visible observing system.

The charge-coupled device (CCD) is the most common architecture for solid-state image sensors. In a CCD, light absorbed in the silicon produces hole-electron pairs. Most of this charge production at visible wavelengths, is within a few microns of the surface of the detector. The charge diffuses under the influence of a localized electrical field near the surface and is collected on an array of capacitors. The image is read out by sequentially shifting the collected charge along a chain of transistors. Two-dimensional readout is accomplished by arranging a large number of parallel columns to empty into successive ports in a single readout row, whose entire contents are shifted out once per step of the column shift. The signals, being small, are amplified on the chip by a single low-noise amplifier.

One of the primary limitations of CCD's is in the detection of x-rays. In a conventional buried channel CCD, the electric fields in the immediate vicinity of the front gate array are responsible for binding and transferring charge form one storage site to the next. These fields do not extend far into the bulk substrate silicon. They are not able to efficiently capture charge diffusing from distances greater than the inter-gate distance.

This limitation is not particularly significant in optical image sensing where the penetration depth of light is only a few microns, or in the soft X-ray band, where it is a fraction of 1 micron.

It is difficult to fabricate a CCD which combines readout and detection in the same layer of silicon. The detector chip needs a high-resistivity low-doping-concentration substrate, while the readout chip is best implemented with a low resistivity medium.

There is a need for real-time nondestructive inspection of manufacturing processes. A real-time system would allow x-ray imaging of flaws, defects, and hidden features of manufactured products. This capability will greatly improve the monitoring and control of a wide variety of manufacturing processes.

Industrial applications are hampered by the cost of film and long exposure times. Phosphor-based electronic arrays and image intensifiers produce low-resolution images. These drawbacks limit x-ray inspection in manufacturing to the most critical high-end applications such as turbine blade inspection. Fast-action high-resolution x-ray vision applied to high-production casting lines and soldered circuit boards would greatly enhance manufacturing efficiency and quality of the products. Existing inspection methods are not conducive to closed-loop control of such processes as laser welding.

SUMMARY OF THE INVENTION

The present invention adapts hybrid semiconductor pixel arrays for use in x-ray imaging with particular application to nondestructive examination of organic subjects. In an alternative embodiment of the invention real time process monitoring and nondestructive test inspection of industrial and manufacturing processes is also described.

A non-destructive test system includes a source for generating x-rays aimed at a subject under test. When the subject is exposed to the x-rays it selectively absorbs the x-rays. A hybrid semiconductor pixel array positioned proximate the subject under test receives and converts the unabsorbed x-ray photons passing through the subject directly into electrical signals. A processor receives and converts the electrical signals into an electronic image.

An automated, real time, non-destructive test system in a manufacturing process incorporates an x-ray source aimed at an object under test. The object selectively absorbs these x-rays. A hybrid semiconductor pixel array positioned proximate the object under test receives and converts unabsorbed x-ray photons passing through it into electrical signals. A processor connected to the read out portion of the hybrid semiconductor pixel array receives and converts the electrical signals into an electronic image. Image reconstruction techniques such as computed tomography is also employed. A comparator compares this electronic image to a stored known image for the object under test. Any deviation found during this comparison is compensated for in the manufacturing process when the comparator generates a feedback electrical signal. The feedback electrical signal becomes a real time input into the manufacturing process achieving system correction for future manufactured objects.

A non-destructive test system for biomedical applications incorporates a low energy source for x-rays aimed at an organic subject under test. The subject exposed to the low energy x-rays selectively absorbs the x-rays. A hybrid semiconductor pixel array positioned proximate the organic subject under test receives and converts unabsorbed x-ray photons passing through the subject into electrical signals. A processor receives and converts the electrical signals into an electronic image of the organic subject under test.

Methods of nondestructive examination of both organic and inorganic subjects using hybrid semiconductor pixel arrays to directly convert selectively absorbed x-ray photons into electrical signals are also disclosed.

DESCRIPTION OF THE DRAWINGS

The above set forth and other features of the invention will be made more apparent in the ensuing Detailed Description of the Invention when read in conjunction with the attached Drawing, wherein.

DETAILED DESCRIPTION OF THE INVENTION

A hybrid is a detector array with many thousands of individual detector pixels on a single semiconductor substrate interconnected to a corresponding readout with individual amplifiers and signal conditioning circuits for each pixel and multiplexer output.

These arrays are hybridized via interconnects. We describe by way of only one example indium bump interconnects. The interconnect bump technology is used to interface readouts with sensors optimized for energies other than the infrared, producing large area, high density pixel arrays for x-ray imaging.

Improvements in contrast resolution is based on the capability of semiconductor pixel array detectors to directly convert x-ray photons to an electronic image. In a semiconductor pixel detector, x-ray photons are converted directly into electronic signals in a single step. Hybrid arrays offer the flexibility of using a variety of solid-state materials of varying thicknesses to optimize the energy range of applications. Increased spatial resolution is a function of the small 30×30 um pixel cells that are fabricated.

In a hybrid array, the detector array and the readout array or chip are optimized separately because the detectors are processed separately from the readouts. Separate optimization provides for improved performance and reduced cost. One readout type is used with a variety of different sensing arrays. The hybrid format provides for a high fill factor. The detector array is positioned on top of the readout array or chip, a fill factor of greater than 95 percent is achieved. Pixel sizes of <30 microns are obtainable with high yield. The readout technology support frame rates in excesses of 100 Hz.

The spatial resolution of various known x-ray detectors as compared to pixel detectors is shown in Table 1.

TABLE 1

| DETECTORS | RESOLUTION |
| --- | --- |
| Xenon Proportional Tube | 2000 Microns |
| Light Converting Screen | 200–300 Microns |
| High Quality Film | 100 Microns |
| Pixel Detectors | 30 Microns |

A pixel detector array offers a high spatial resolution of 30 microns as compared to 100 microns for the highest quality x-ray film. The solid state pixel detectors, with a detecting thickness of up to one thousand microns, provides direct conversions of x-rays to electrical signal over the entire spectral range of less than 1 KeV to greater than 100 KeV. The pixel detector array does not require the intermediate use of phosphor converter screens as employed with CCD's.

Semiconductor diode arrays provide contrast resolution more than an order of magnitude greater than that of current light converter screens and a factor of five improvement in spatial resolution over the entire range of x-ray energies.

Figure 1:
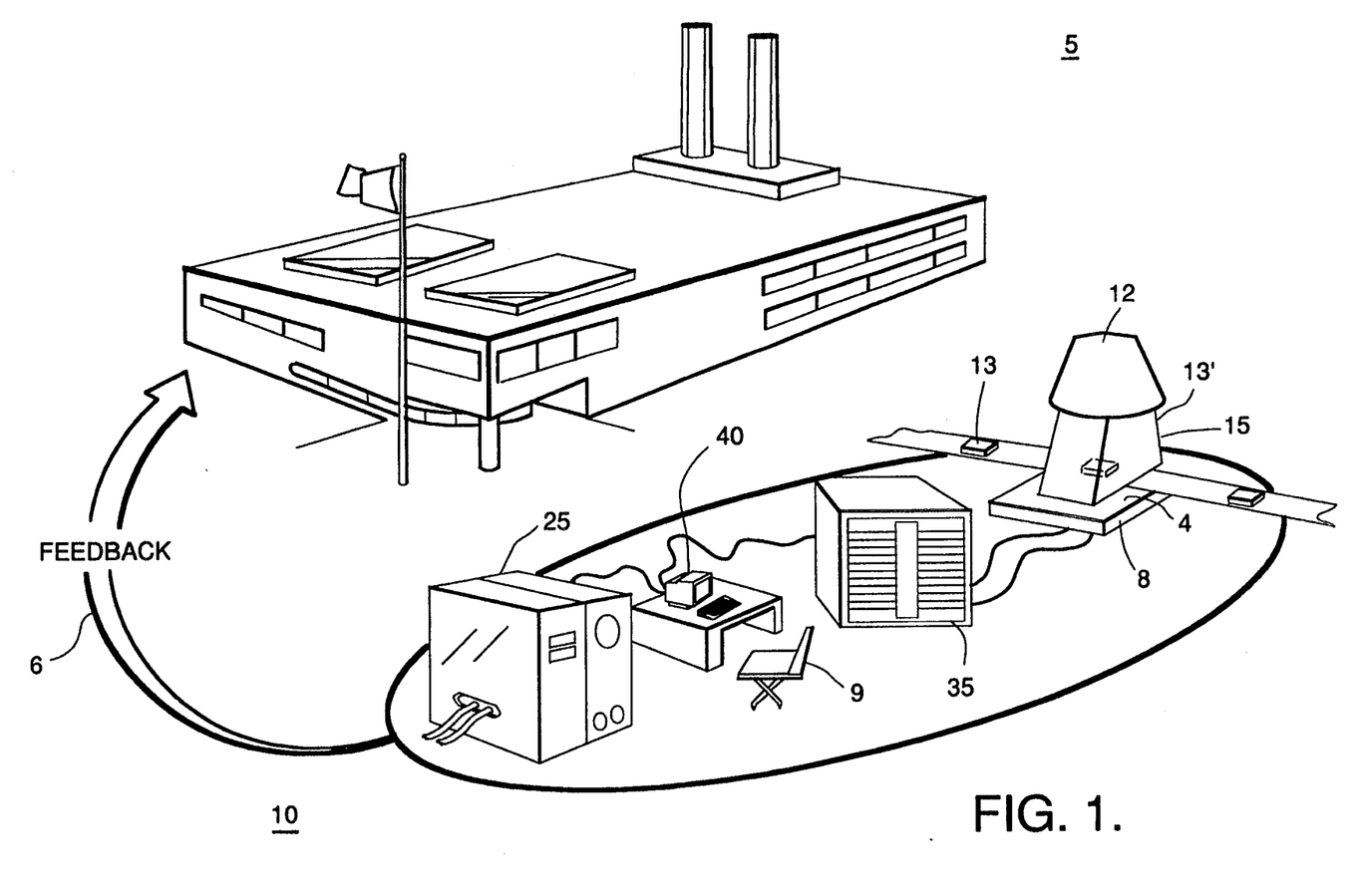
FIG. 1 is a schematic representation of an automated manufacturing process incorporating a hybrid semiconductor pixel array.

FIG. 1 is a schematic representation of an automated manufacturing process incorporating a hybridized semiconductor pixel array. In a manufacturing facility 5 an x-ray test system 10 evaluates a manufactured unit 13 using x-ray nondestructive examination facilities 8.

The unit 13 is exposed to a source 12 of x-ray 15 while on the manufacturing line. The unit under test 13' is positioned over a hybrid semiconductor pixel array 4 during the x-ray 15 exposure. The unit under test 13 selectively absorbs the x-rays 15 causing the pixel array 4 to generate electrical signals in response to the exposure.

An image computer 35 receives the electrical signals from the pixel array 4. As shown in FIG. 1, the image computer 35 converts the signals into an electronic image which is displayed on image display monitor 40. An operator seated at the image display station 9 visually interprets the image from the monitor 40 and affects the manufacturing process in response to detected defects in unit under test 13'.

In a fully automated manufacturing facility a signal received by the image display monitor would also become input to the process control system 25. The process control system 25 compares the electronic image of the unit under test 13' to a known stored image. If there is not an exact comparison between the generated and stored known electronic images a defect in the unit under test 13' is detected. A feedback signal 6 is sent to the manufacturing process to correct the unit 13 for defects in future production runs.

One manufacturing application of the automated test system uses x-ray nondestructive test and feedback control on automobile body laser weld lines during automobile manufacture. This application uses a small, lightweight robot mounted system operating in real-time inspecting many welds.

Currently, there is no way to ensure that a spot weld on an auto body is integral. Bad welds cannot be tolerated for safety reasons. A common technique currently employed to ensure the integrity of the car body is to apply extra welds. On a typical automotive production line, an additional 20 percent of extra welds are designed into the car body to ensure, on a statistical basis, that every car body built will be structurally sound. Consequently, most of the cars now produced have far more welds than necessary, increasing welding and overall vehicle costs.

A real-time, high resolution nondestructive test system inspects 100 percent of the welds in process. The cell control software is set so that extra welds are added only when a bad weld is detected. The welder is also adjusted when bad welds occur. The real-time feedback nature of the nondestructive test system thereby ensures 100 percent good welds.

Figure 2:
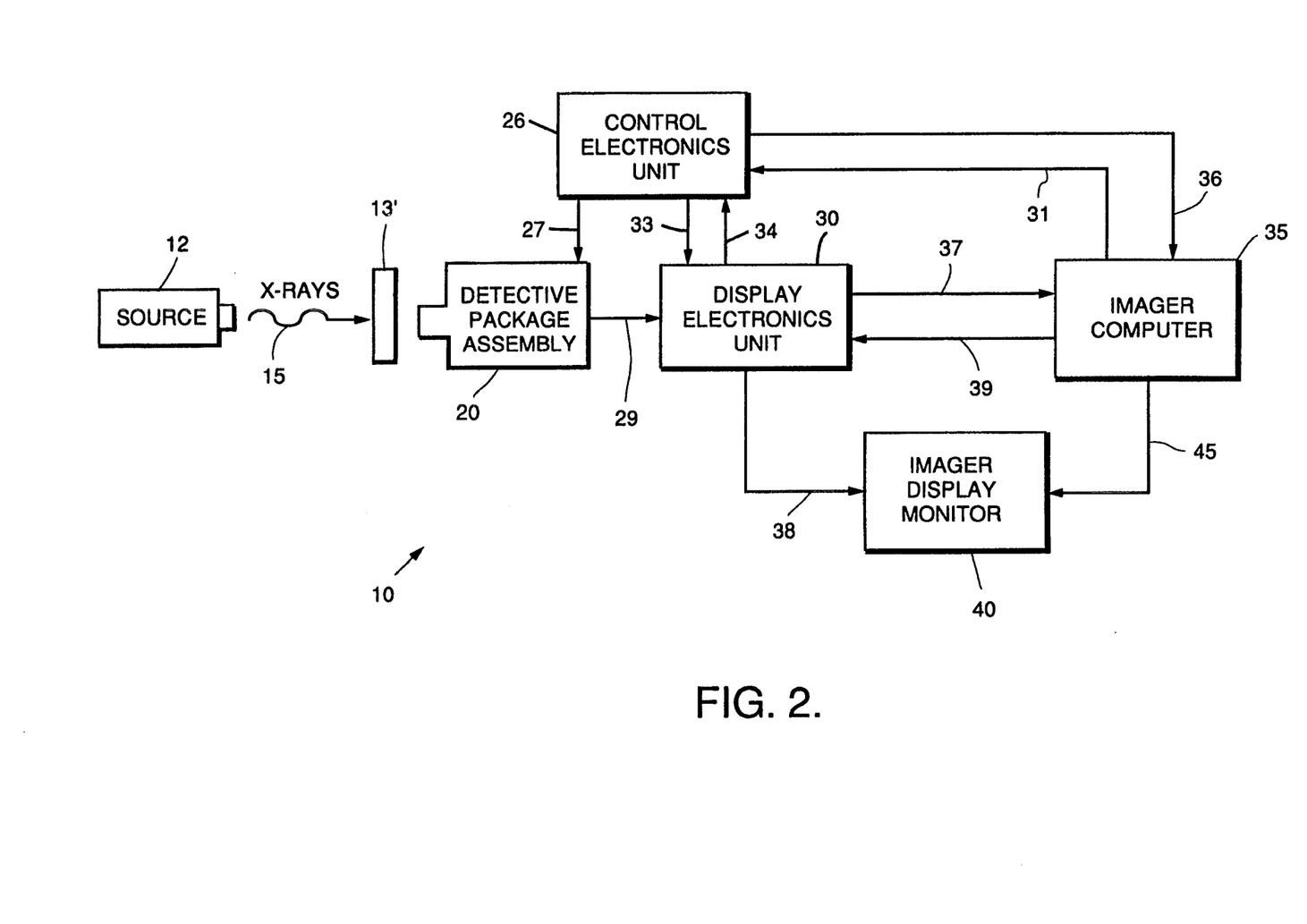
FIG. 2 is a schematic representation of a hybrid semiconductor array test system.

FIG. 2 is a schematic representation of a hybridized semiconductor array test system 10. An array test system 10 is divided into five major components: detective package assembly (DPA) 20, control electronics unit (CEU) 26, display electronics unit (DEU) 30, display monitor 40, and controlling computer 35. The imager system design allows the interchangeability of the DPA 20 and CEU 26.

A source 12 of x-rays 15 bombards unit under test 13'. Unit under test 13' selectively absorbs the x-rays 15 exposing the detective package assembly 20 which contains the pixel array. The DPA 20 is equivalent to either the x-ray film and holder or phosphor screen in a conventional x-ray imaging system. The DPA 20 contains the hybrid pixel array, which is the hybrid detector and readout array, and its supporting fixture or connector.

If a detector material is used in the array which requires cooling below room temperature in order to reduce thermal-induced detector noise, a means of cooling the chip such as a small thermoelectric cooler, is included in the DPA 20. The CEU 26 contains the design-specific clock and bias generation electronics necessary to operate each hybrid array. This system receives its master clock pulse and bias signals 34 from the DEU 30 and is controlled by the imager computer 35. Like the DPA 30, the CEU 26 is interchangeable, dependent upon the type of array used.

As shown in FIG. 2, DEU 30 generates the master clock pulses and biases for the chip and CEU 26. The DEU 30 also provides necessary data acquisition electronics, including gain/offset correction, analog-to-digital converters, multiple-frame storage buffers, and a direct connection to the subsystem display monitor for frame-by-frame display of the imaged signal.

Under the direction of the imager computer 35, the DEU 30 controls the; DPA 20 and CEU 26 thereby obtaining single and multiple frames of imaging data. The analog data 29 received from the DPA 20 is digitized using 12-bit analog-to-digital converters and corrected for gain and offset nonuniformities before being stored in the frame buffers. Data is either displayed directly on the imager monitor 40 or sent to the imager computer 35 for additional manipulation, such as frame addition and other low-level image processing algorithms.

The imager computer 35 shown in FIG. 2 is powerful enough to control the entire x-ray test system 10 and serve as an interface to equipment outside of the system. The imager computer 35 is equipped with a large fixed disk storage capability and a network connection suitable to transfer the acquired data to other computer systems where additional image processing is accomplished.

Figure 3:
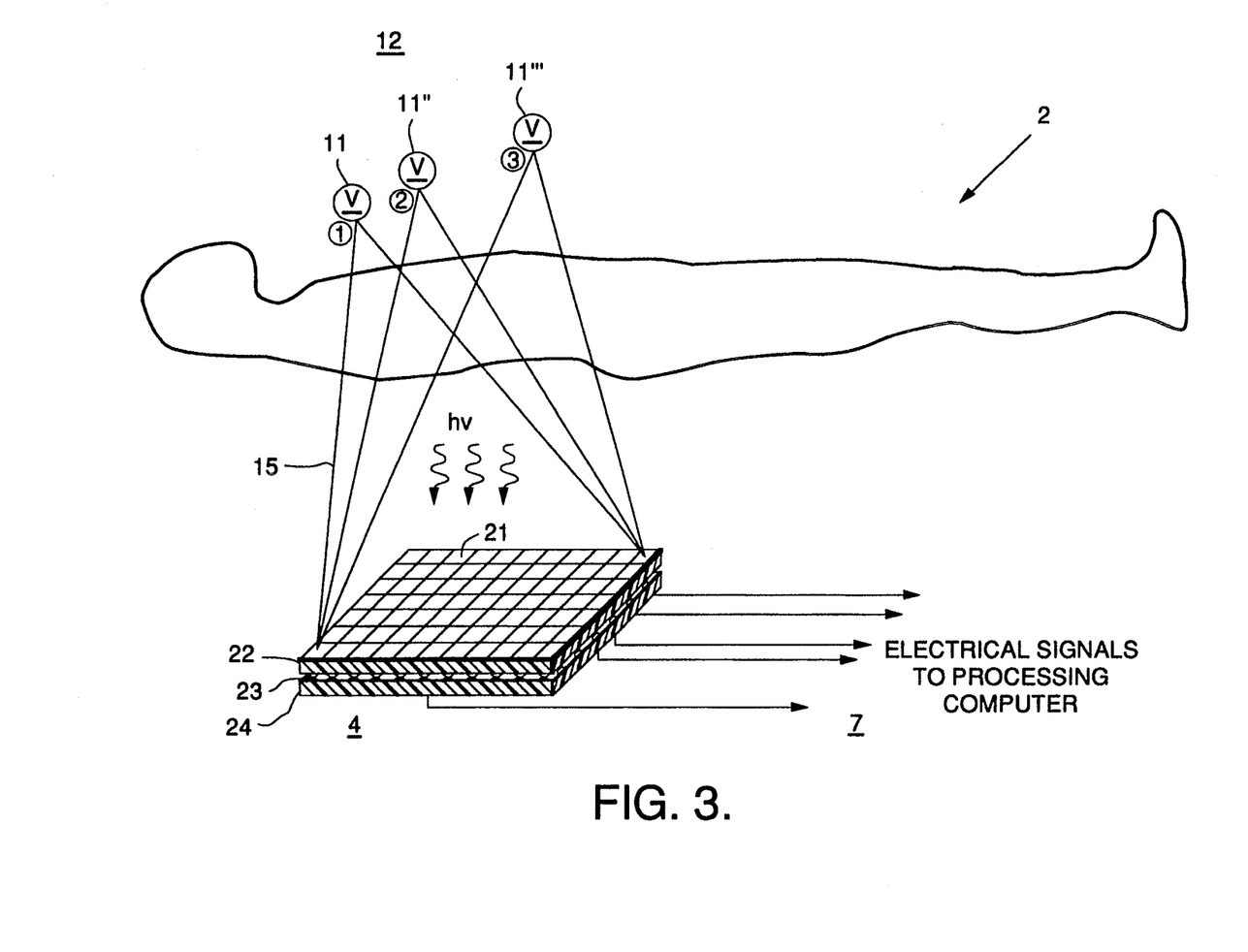
FIG. 3 is a schematic representation of a non-destructive examination in a biomedical application incorporating a hybrid semiconductor pixel array.

FIG. 3 is a schematic representation of non-destructive test examination in a biomedical application incorporating a hybrid semiconductor pixel array 4. The two dimensional imaging of x-rays also offers the potential for three dimensional computer tomography. As shown in FIG. 3, the hybrid semiconductor pixel array 4 includes a detector array 22, an interconnect 23 and a readout chip 24.

Multiple x-ray sources 12 are used to image an organic subject 2. Pixel detector arrays 4 are used to detect the x-rays 15 emitted from a large distribution of x-ray paths 11, 11' and 11'' through the organic subject 2. This use of multiple x-ray sources 12 eliminates the need for rotational mechanism and shortens the time for producing a CT image.

Types of x-ray sources used in the test system include, but are not limited to high energy tubes, Cobalt 60 or x-rays generated by a synchrotron. Higher speed with frame rates in excess of 100 frames a second facilitates dynamic x-ray imagery. The higher sensitivity of these arrays reduces the total dose of x-ray aimed at the organic subject 2 under examination.

By way of example, one application of the invention as shown in FIG. 3 in the biomedical industry is directed to dental x-ray machines. This application requires very small detectors for high spatial resolution. The detectors have high sensitivity for enhanced contrast, lower energy, and shorter dosage times to reduce health risks. The complete detector arrays are approximately 1 cm square and a few millimeters thick. Properly packaged, such an array easily fits into any pan of the mouth. Images taken, are either instantly displayed, enhanced, retaken, archived, and retrieved. Image analysis and enhancement software detects decay and other dental deformities instantly.

Other biomedical uses for the hybrid semiconductor, real-time, non-destructive test x-ray imaging include, but are not limited to low-dosage, all electronic x-ray, microsurgery endoscopes, cardiac motion in vitro, cell miosis and mitosis, examination of viral infections, protein crystallography, x-ray microscope and medical computer tomography.

Figure 4:
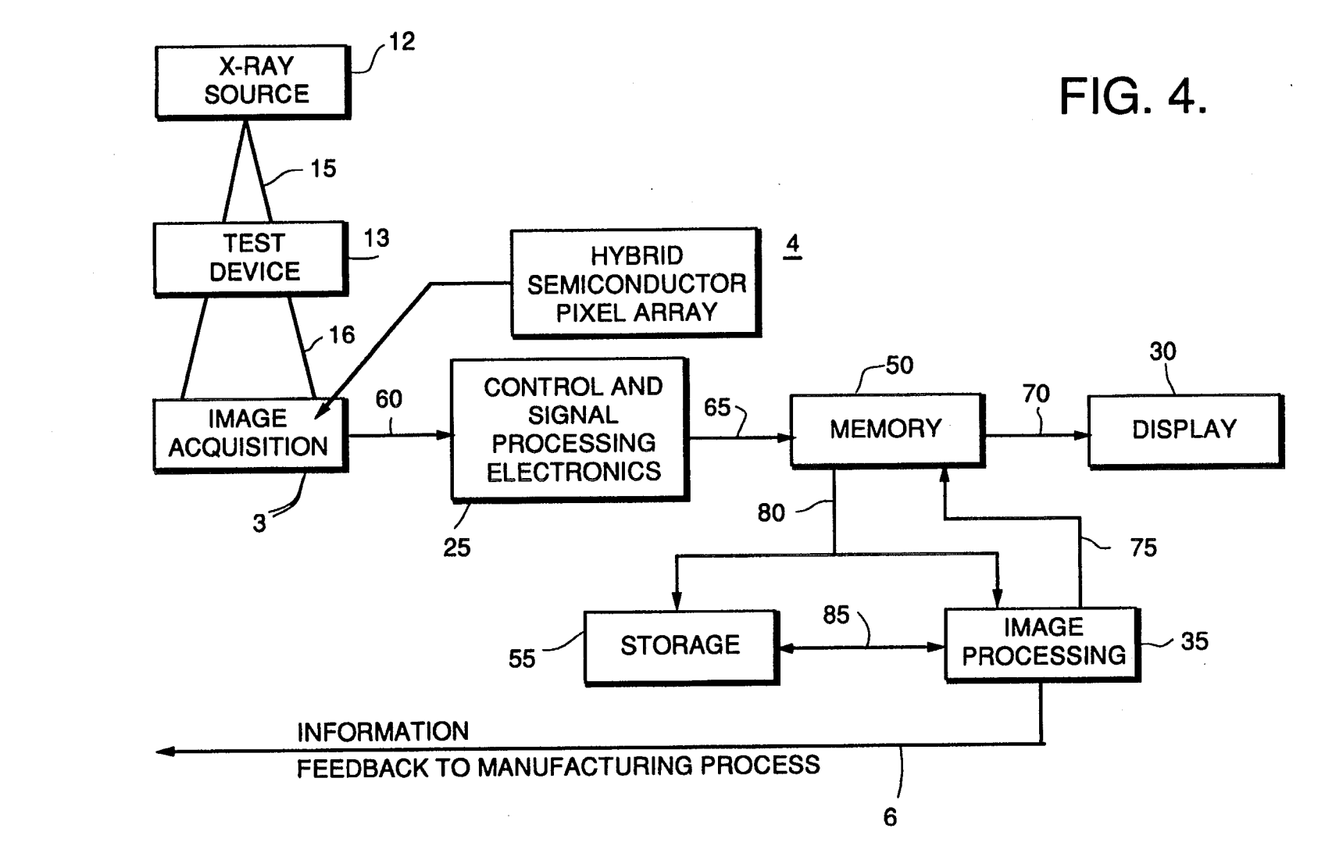
FIG. 4 is a schematic representation of a manufacturing process incorporating x-ray examination and a hybrid semiconductor pixel array.

FIG. 4 is a schematic representation of manufacturing process incorporating x-ray nondestructive examination and hybrid semiconductor pixel array 4. An x-ray 15 source 12 bombards unit under test 13'. The unit 13' selectively absorbs x-ray photons 16. Unabsorbed photons enter the image acquisition stage of an automated manufacturing process through exposure to the hybrid semiconductor pixel array 4. The pixel array 4 converts the received photons 16 directly into electrical signals 60 which enter control and signal processing electronics 25. The electronic image generated by the control and signal processing electronics 25 is stored as digital data 65 into a memory 50. This data 65 stored within memory 50 is convened into an appropriate electrical display image signal 70 for display 30 after it is image processed 75 by the image processor 35. The same data is stored as digital information 80 in storage 55, or convened into a feedback signal 6. Feedback signal 6 impacts the manufacturing process in response to detected defects.

Figure 5:
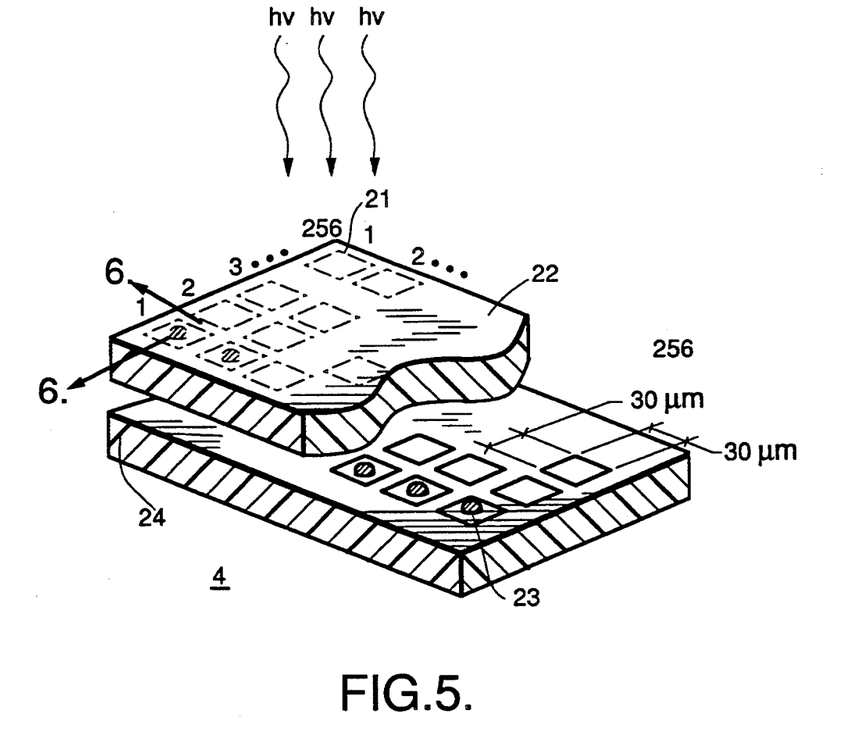
FIG. 5 is a schematic representation of a hybrid semiconductor pixel array having cross section VI—VI.

FIG. 5 is a schematic representation of a hybrid semiconductor pixel array 4. The proposed arrays 4 are fabricated from silicon or other higher atomic number materials such as germanium or cadmium telluride in a variety of thicknesses allowing for optimization to a particular x-ray energy.

The detectors 22 are bonded to a silicon readout chip 24 which is fabricated by conventional means, as more clearly shown in FIG. 5. The readout 24 and detector 22 chip are individually optimized. The higher atomic number detector materials are useful with higher energy x-rays. The use of hybrid pixel x-ray detectors enable higher resolution, lower dosage, real-time, high-contrast images in all manufacturing process applications. This nondestructive testing capability will enhance, but is not limited to the areas of; metal and alloy casting solidification, ultra-high quench rate alloy formation, composite microscopic failure mechanics and metal matrix composite mixing.

As shown in FIG. 5, two separate layers of semiconductor material are interconnected with more than 250,000 pixels via indium bump 23 bonds. By applying this capability to x-ray detectors we create area or linear arrays of very small ($-30 \mu m$) pixel detectors 4 which are sensitive to a wide range of x-ray 15 energies.

Any interconnect process utilized between the detector array 22 and the read out array or chip 24 will facilitate the transfer of the electrical signal 7. An indium bump 23 bonding process interconnecting the bottom surface of the detector array 22 to the top surface of the read out chip 24 is shown in FIG. 5, by way of example.

A feature of our approach is the ability to process signals from thousands of individual pixel 21 detectors. We accomplish this through an indium bump 23 hybridization process in which a two-chip hybrid of semiconductors is assembled. The final step in both the readout and detector processing flows is the deposition and definition of individual indium bumps 23 for each pixel 21 in the array 4.

When an electronic device is used to detect x-rays, photoelectrons are produced in the detector medium. The photoelectrons are typically reabsorbed by the medium, creating electron-hole pairs. For example, the energy required to create one electron-hole pair in pure silicon is 3.6 eV. A 1 -keV x-ray produces approximately 300 e-h pairs.

The minimum detectable flux in an electronic detector roughly corresponds to the flux that produces an electronic signal equal to the noise level. If a solid-state device has a single element (pixel) that is $20 \times 20 \mu m$ and an electronic noise of 10 e's per second, then the minimum detectable flux may be calculated as follows:

$$\frac{10 \text{ } e\text{-}h \text{ pairs} \times 3.6 \text{ } eV/e\text{-}h \text{ pair}}{20 \text{ } \mu m \times 20 \text{ } \mu m \times 1 \text{ sec.}} =$$

$$9.0 \times 10^{-3} \text{ } eV \text{ } \mu m - 2 \text{ } s - 1 = 1.4 \times 10^{-6} \text{ ergs cm}^{-2}s^{-1}$$

The maximum detectable flux is limited by the readout time and the maximum amount of charge that can be stored by the readout device. This storage capability is referred to as the "well depth". The typical storage capacity of a CCD is within the approximate range of $2 \times 10_5$ to $5 \times 10_5$ electrons. Photo diode arrays typically have larger storage capacities, with an approximate well depth of $10^7$ electrons. CCD's for direct x-ray imaging have a quantum efficiency that is several orders of magnitude below that of a hybrid pixel array.

Figure 6:
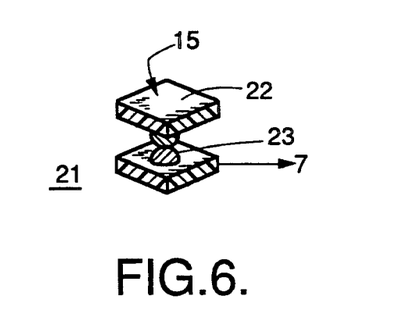
FIG. 6 is a cross sectional view taken along line VI—VI of the hybrid semiconductor array of FIG. 5.

FIG. 6 is a cross sectional view taken along line VI—VI of the hybrid semiconductor array 4 of FIG. 5. The readout 24 and detector 22 die are placed together with the indium bumps 23 touching. Mechanical pressure fuses or cold welds the bumps 23 together. This fusing provides the electrical connection from each detector pixel 21 to its corresponding readout unit cell amplifier and serves as a mechanical connection between the two chips. The hybrid design also allows the detector material and thickness and the readout design and process to be individually optimized.

By way of example, but not in the limiting sense, the array shown in FIG. 5 is composed of silicon. The detector array 22 is approximately 5000 $\Omega cm$ N-type silicon having a thickness of approximately 300 $\mu m$. The read out array or chip 24 is approximately 1 $\Omega cm$ silicon. Each pixel 21 has a configuration of 30 $\mu m$ by 30 $\mu m$.

The readout and signal processing circuits operable to convert the output electrical signals 7 from the indium bumps 23 may be similar to that disclosed in U.S. Pat. No. 4,970,567, issued to Ahlgren et al., entitled, "Method and Apparatus for Detecting Infrared Radiation" owned by the assignee of record of this invention. The readout and signal processing circuits may also be similar to that disclosed in Bluzer, N., and Stehlac, R., "Buffered Direct Injection of Photocurrents into Charge-Coupled Devices", IEEE Transactions on Electron Devices, ED 25, n.2p. 160 February 1978, which is hereby incorporated by reference. It should be understood that other suitable means for processing the output from the semiconductor layers may be used.

The objects and processes monitored by the x-ray nondestructive test system determines the power of the x-ray energies employed. The interaction (absorption) of the x-rays in a given material is an exponential function of the thickness and density of the material. To optimize the image of the material, one must choose the correct x-ray photon energy to optimize the fraction of transmitted photons versus absorbed photons. Thus, low-density materials, such as composites, epoxies, and organics, require low-energy x-rays below 40 KeV, whereas thin metal sheets require energies between 40 and 100 KeV.

Higher energies, from 100 to 300 KeV, are used for examining engine components and heavier iron castings. Thick walled heavy metal castings, or heavy metal welds are examined by x-ray energies in the 100 KeV to 1MeV range.

Based upon the significantly improved energy sensitivity of semiconductor arrays over light converters at photon energies below 50 KeV, it can be inferred that this system has exceptional utility for the x-ray nondestructive examination of plastics, composites, electronics, and thin-walled castings.

One example of the hybrid semiconductor pixel array is a hybridized 300 $\mu m$ thick silicon pixel detector array having a $30 \times 30 \mu m$ pixel size connected to an existing electronic readout in a $256 \times 256$ format. This array, as shown in FIG. 5 provides high-resolution x-ray images. The active area of the array is approximately 7.68 mm square. A noise level in the electronic readout at room temperature of approximately 300 electrons is associated with this array.

By way of example, silicon is used in the fabrication of the hybrid semiconductor array. Alternative array materials include, but are not limited to germanium (Ge), cadmium telluride (CdTe) and indium antinomide (InSb). Solid state detectors fabricated from any of these materials with a sensitive thickness of up to 1000 microns offer direct conversion and improved sensitivity for x-rays as compared to existing detectors used with converter screens.

In summary, the hybrid pixel arrays provide; three times better spatial resolution over current x-ray imaging technology, ten to 100 times higher contrast sensitivity than current technology for the same x-ray dose, five to 100 times lower exposure dosages than current technology for the same contrast resolution and more than ten times larger dynamic range than current technology.

It should be realized that applications of the teaching of the invention include, but are not limited to the non-destructive testing of organic and inorganic subjects using hybrid semiconductor pixel arrays sensitive to x-ray exposure. Specifically, the above described invention is directed to, but not limited by the areas of; x-ray radiography, machine vision, nondestructive test and evaluation, biomedical and scientific research. X-ray imagery incorporating the hybrid semiconductor pixel array is used anywhere high-resolution pictures of internal structures are used. Furthermore, the various blocks depicted in the drawings may be implemented with alternative materials and analog or digital components.

Thus, while the invention has been particularly shown and described with respect to preferred embodiments thereof, it will be understood by those skilled in the art that changes in form and details may be made therein without departing from the scope and spirit of the invention.

We claim:

1. An non-destructive test system, comprising:
   at least one source for x-rays;
   a hybrid semiconductor pixel array positioned to receive and convert x-ray photons from said source into electrical signals, wherein said pixel array is comprised of a plurality of detector pixels on a semiconductor substrate individually interconnected to a readout chip; and
   a processor operable to receive and convert said electrical signals into an electronic image.

2. The non-destructive test system in claim 1 wherein said source for x-rays further comprises a high energy tube.

3. The non-destructive test system in claim 1 wherein said source for x-rays further comprises Cobalt 60.

4. The non-destructive test system in claim 1 wherein said source for x-rays further comprises a synchrotron.

5. The system of claim 1 wherein said detector array comprises silicon.

6. The system of claim 1 wherein said detector array comprises germanium.

7. The system of claim 1 wherein said detector array comprises cadmium telluride.

8. The system of claim 1 wherein said detector array comprises indium antimonide.

9. A method of providing a non-destructive test system, said method comprising the steps of:
   providing at least one source for x-rays;
   providing a subject under test exposed to said x-rays, said subject operable to selectively absorb said x-rays;
   providing a hybrid semiconductor pixel array positioned proximate said subject under test operable to receive and convert unabsorbed x-ray photons passing through said subject under test into electrical signals, wherein said pixel array is comprised of a plurality of detector pixels on a semiconductor substrate individually interconnected to a readout chip; and
   providing a processor operable to receive and convert said electrical signals into an electronic image.

10. A method of non-destructive testing, said method comprising the steps of:
    generating x-rays from at least one source;
    exposing a subject under test to said x-rays, said subject operable to selectively absorb said x-rays;
    positioning a hybrid semiconductor pixel array proximate said subject under test, said hybrid semiconductor pixel array operable to receive and convert unabsorbed x-ray photons passing through said subject under test into electrical signals, wherein said pixel array is comprised of a plurality of detector pixels on a semiconductor substrate individually interconnected to a readout chip processing said electrical signals into an electronic image.

11. An automated non-destructive test system, used in a manufacturing process, comprising:
    at least one source for x-rays;
    an object under test exposed to said x-rays, said object operable to selectively absorb said x-rays;
    a hybrid semiconductor pixel array positioned proximate said object under test operable to receive and convert unabsorbed x-ray photons passing through said object under test into electrical signals, wherein said pixel array is comprised of a plurality of detector pixels on a semiconductor substrate individually interconnected to a readout chip;
    a processor operable to receive and convert said electrical signals into an electronic image; and
    a comparator operable to compare said electronic image to a stored known image for said object, said comparator further operable to generate a feedback electrical signal into said manufacturing process.

12. The non-destructive test system in claim 11 wherein said source for x-rays further comprises a high energy tube.

13. The non-destructive test system in claim 11 wherein said source for x-rays further comprises Cobalt 60.

14. The non-destructive test system in claim 11 wherein said source for x-rays further comprises a synchrotron.

15. A method of providing an automated non-destructive test system to a manufacturing process, comprising:
    providing at least one source for x-rays;
    providing an object under test exposed to said x-rays, said object operable to selectively absorb said x-rays;
    providing a hybrid semiconductor pixel array positioned proximate said object under test operable to receive and convert unabsorbed x-ray photons passing through said object under test into electrical signals, wherein said pixel array is comprised of a plurality of detector pixels on a semiconductor substrate individually interconnected to a readout chip;
    providing a processor operable to receive and convert said electrical signals into an electronic image; and
    providing a comparator operable to compare said electronic image to a stored known image for said object, said comparator further operable to generate a feedback electrical signal into said manufacturing process.

16. An automated method of non-destructive testing incorporated into a manufacturing process, said method comprising the steps of:
generating x-rays;
exposing a manufactured object under test to said x-rays, said object operable to selectively absorb said x-rays;
positioning a hybrid semiconductor pixel array proximate said object under test, said hybrid semiconductor pixel array operable to receive and convert unabsorbed x-ray photons passing through said object under test into electrical signals, wherein said pixel array is comprised of a plurality of detector pixels on a semiconductor substrate individually interconnected to a readout chip;
processing said electrical signals into an electronic image;
comparing said electronic image to a stored known image of said manufactured object; and
revising the manufacturing process in response to the comparison between said manufactured object under test and said stored known image of said manufactured object.

17. A non-destructive test system for biomedical applications, comprising:
at least one source for x-rays;
an organic subject under test exposed to said x-rays, said subject operable to selectively absorb said x-rays;
a hybrid semiconductor pixel array positioned proximate said subject under test operable to receive and conceal unabsorbed x-ray photons passing through said subject under test into electrical signals, wherein said pixel array is comprised of a plurality of detector pixels on a semiconductor substrate individually interconnected to a readout chip; and
a processor operable to receive and convert said electrical signals into an electronic image of said organic subject under test.

18. A method of providing a non-destructive test system for biomedical applications, comprising:
providing at least one source for x-rays;
providing an organic subject under test exposed to said x-rays, said subject operable to selectively absorb said x-rays;
providing a hybrid semiconductor pixel array positioned proximate said subject under test operable to receive and convert unabsorbed x-ray photons passing through said subject under test into electrical signals, wherein said pixel array is comprised of a plurality of detector pixels on a semiconductor substrate individually interconnected to a readout chip; and
providing a processor operable to receive and convert said electrical signals into an electronic image of said organic subject under test.

19. A manufacturing system incorporating a non-destructive test system, comprising:
a manufacturing line for producing an object, said object operable to selectively absorb x-rays;
a non-destructive test system disposed along said manufacturing line for evaluating said object, said test system comprising:
at least one source of x-rays positioned to expose said object to x-rays;
a hybrid semiconductor pixel array positioned proximate said object operable to receive and convert unabsorbed x-ray photons passing through said object into electrical signals, wherein said pixel array is comprised of a plurality of detector pixels on a semiconductor substrate individually interconnected to a readout chip;
a processor operable to receive and convert said electrical signals into an electronic image; and
a comparator operable to compare said electronic image to a stored known image for said object, said comparator further operable to generate a feedback electrical signal into said manufacturing system.

* * * * *